A. E. ELLIS.
VEHICLE WHEEL.
APPLICATION FILED OCT. 5, 1908.
972,606.
Patented Oct. 11, 1910.
2 SHEETS—SHEET 1.
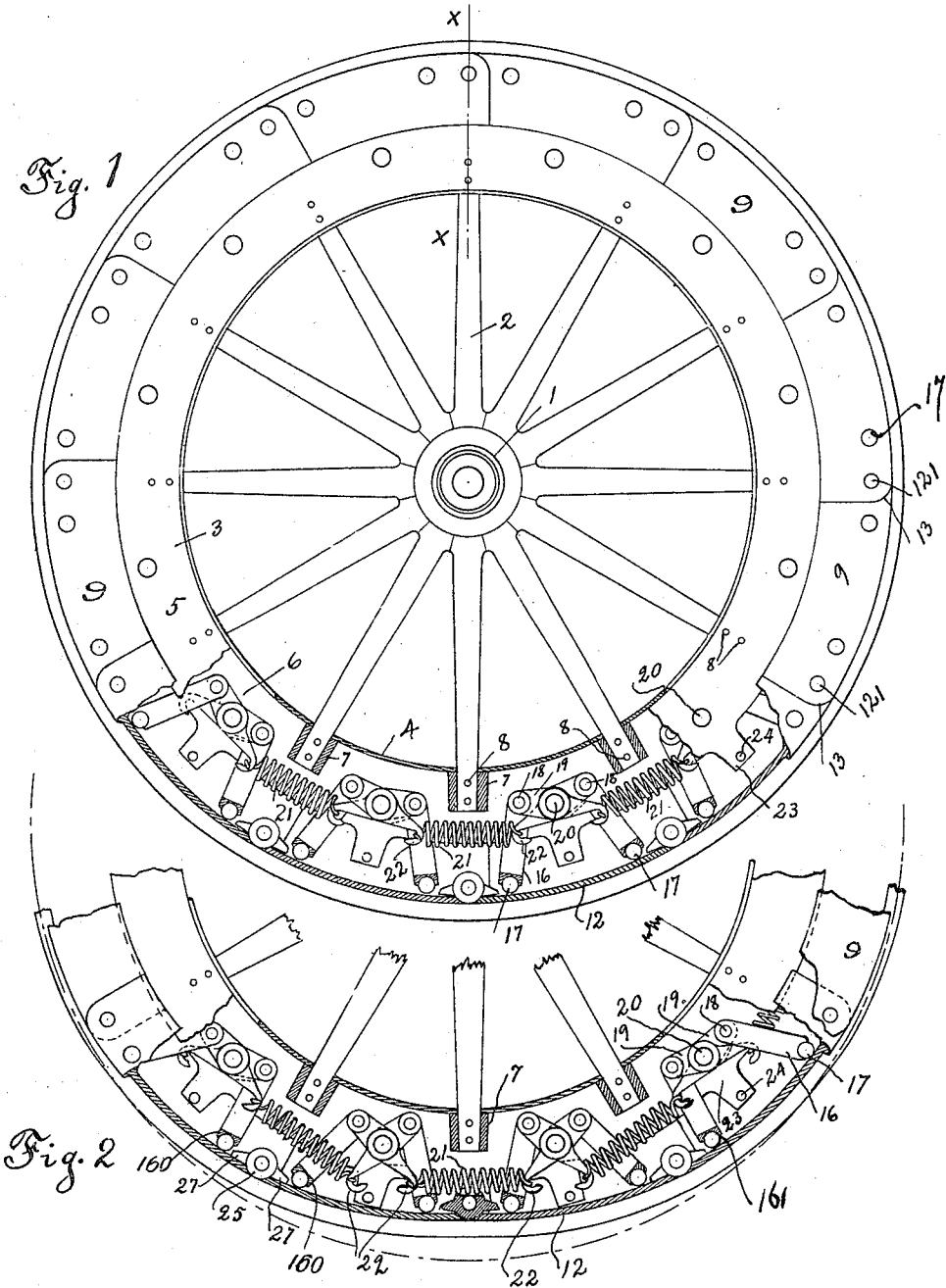

A. E. ELLIS.
VEHICLE WHEEL.
APPLICATION FILED OCT. 5, 1908.

972,606.

Patented Oct. 11, 1910.
2 SHEETS—SHEET 2.

WITNESSES
Alice T. Harrington
Mary A. Kenney

INVENTOR
Axel E. Ellis,
By his Attorney

UNITED STATES PATENT OFFICE.

AXEL E. ELLIS, OF BOSTON, MASSACHUSETTS, ASSIGNOR TO STEEL CUSHION TIRE COMPANY, OF BOSTON, MASSACHUSETTS, A CORPORATION OF ARIZONA TERRITORY.

VEHICLE-WHEEL.

972,606.

Specification of Letters Patent.

Patented Oct. 11, 1910.

Application filed October 5, 1908. Serial No. 456,157.

*To all whom it may concern:*

Be it known that I, AXEL E. ELLIS, a citizen of the United States, residing at Boston, in the county of Suffolk and State of Massachusetts, have invented certain new and useful Improvements in Vehicle-Wheels; and I do hereby declare the following to be a full, clear, and exact description of the invention, such as will enable others skilled in the art to which it appertains to make and use the same.

My invention relates to cushion tired wheels for vehicles and more particularly to such wheels as are adapted for use on automobiles.

The object of my invention is to produce a resilient or cushion tired wheel which shall in appearance and action resemble the well known pneumatic tire but without the use of rubber and its attendant disadvantages.

A further object is to produce a wheel in which the cushion tire portion is composed of a plurality of independent segmental sections having a compressive movement radially with relation to the rim portion a yielding compression resistance mechanism, so constructed and arranged that the compressive load strains will be borne and resisted by a plurality of adjacent segmental sections and progressively transferred as the wheel revolves, and further to produce a cushion tire which while sensitive to a degree under normal conditions, will under abnormal conditions when subjected to greatly increased compressive strains, as in running over projections in the road, quickly and in increased ratio increase the power of the compressive resistance much in the same manner as the ordinary pneumatic tire.

To the above ends the present invention consists of the improved cushion tire and wheel, which will be hereinafter described and claimed.

My invention is shown in the accompanying drawings in which:—

Figure 6:
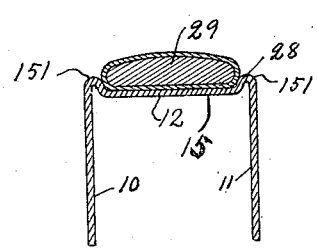
Figure 3:
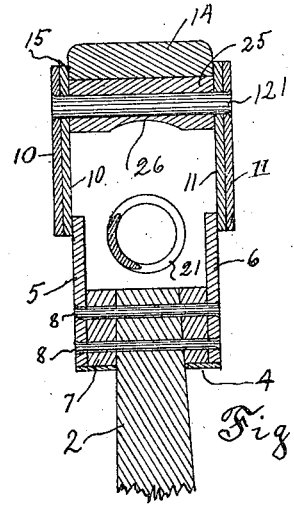
Figure 7:
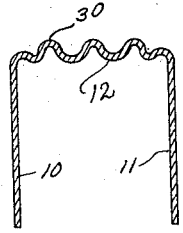
Figure 4:
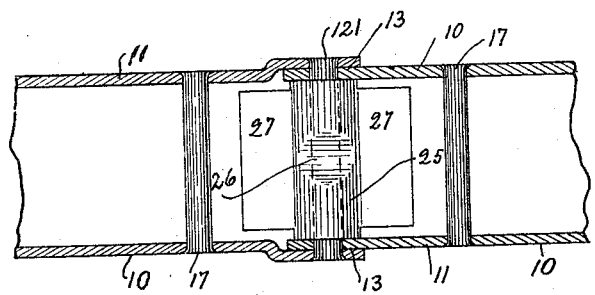
Figure 5:
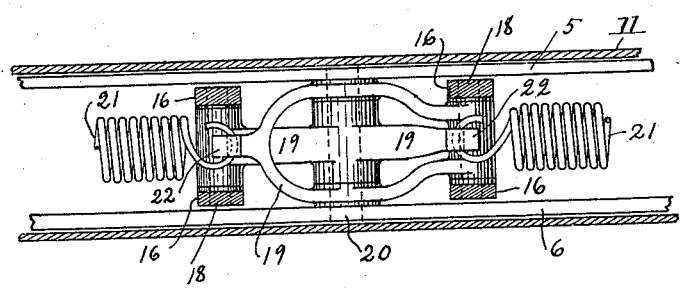

Figure 1, shows the wheel in side elevation with parts broken away to show the compression resistance mechanism. Fig. 2, shows a view of a portion of the wheel illustrating the action of the segmental sections of the tire portion and the compression resistance mechanism. Fig. 3, shows a vertical section through the outer end of one of the spokes and through the rim and tire portion taken on the line *x—x* Fig. 1. Fig. 4, shows a longitudinal sectional view through one of the joints connecting the meeting ends of the segments. Fig. 5, shows a sectional view taken above the pivoted point of the levers of the compression resistance mechanism. Figs. 6 and 7, illustrate different forms of tread surfaces.

Similar reference numerals will be used throughout the specification and drawings to designate corresponding parts.

The wheel comprises a hub 1, of any usual or preferred construction, to which are attached the radiating spokes 2. About the outer ends of the spokes 2, there is secured a circular rim portion 3, consisting of a base 4, and side flanges 5 and 6. The base 4, and the side flanges 5 and 6 may be formed separately and securely fastened together in any suitable manner, and form a substantially hollow trough shaped rim portion, within which are secured the sockets 7, into which the outer ends of the spokes are fitted and securely fastened by means of bolts or rivets 8.

The tire portion of the wheel comprises the curved segmental sections 9, which as shown in Figs. 3, 6, and 7, have side flanges 10 and 11, and a connecting tread plate 12. The tread plate 12, does not show in Fig. 3, as the line upon which this view is taken passes through the meeting ends of the tread plates of adjacent segmental sections. Each of the segmental sections 9, is of a width between the side flanges 10 and 11, corresponding to the width of the rim portion at the outside of the flanges 5 and 6 and the flanges 10 and 11 of the segmental sections 9, are in sliding contact with the outer faces of the flanges 5 and 6 of the rim portion.

In practice the rim portion will be formed of metal either cast or pressed steel, and the segmental sections will also be formed of metal either cast or pressed steel, and will be curved to correspond to a segment of the wheel to be constructed, and in sufficient number to form a continuous articulated tire portion about the rim portion of the wheel, the wheel of the drawings showing a tire portion comprising 12 of the segmental sections. The segmental sections 9, will be hinged to each other as shown, and will be fitted to the rim portion, forming a continuous articulated tire portion entirely surrounding the rim portion, and for this purpose the side flanges 10 and 11, of the segmental sections at one end thereof are arranged to fit between the side flanges at the meeting end of an adjacent segmental section, as clearly shown in Fig. 4, of the drawing, and the segmental sections are connected to each other by the pivotal bolts 121; thus it will be seen the side flanges 10 and 11 overlap as shown at 13, while the tread plates barely meet as shown clearly in Figs. 1 and 2.

In order that there shall be no spaces or openings between the meeting ends of adjacent tread plates the bolts 121, carry cylindrical sleeves 25, which upon their under surface closely fit the space between the ends of the tread plates of adjacent segmental sections, thus filling the openings and as clearly shown in Figs. 1, 2, and 4, the sleeves 25, are provided with radially extending wings 27, which at times bear upon the inner surface of the tread plates of adjacent segmental sections, and insure a coöperation of action between adjacent segmental sections, the movement of one segmental section beyond certain limits under the compressive load strain will have a tendency to rock the sleeves 25, about the bolts 121, whereby the wings, acting as levers will enable the segmental sections adjacent to that one which may be at any time in contact with the ground to assist in resisting the compressive load strains, and in connection with the compression resistance mechanism which will now be described, producing a harmonious coöperative and progressive action of a plurality of adjacent segmental sections as the wheel revolves under the load strains.

The tire portion has a radial movement on the rim portion, and this movement under the load strains is resisted by a yielding compression resistance mechanism comprising a plurality of groups of elements, each group being localized with relation to, and in operative engagement with, a segmental section, and the adjacent groups of elements being yieldingly connected entirely around the wheel, resulting in a coöperative simultaneous action of a plurality of the groups of elements, comprising the compression resistance mechanism of adjacent segmental sections, which at any time are bearing and resisting the compressive load strains, although but one of the segmental sections may be in actual contact with the ground. The arrangement is such that an extremely sensitive cushioning action will result under normal conditions, but in which the compressive resistance is quickly and progressively increased under increased compressive force or shocks caused by the wheel running over hummocks or inequalities in the road. This compression resistance mechanism in the illustrated embodiment of my invention consists of the pairs of crossed levers 19, (see Figs. 1, 2 and 5,) which levers are pivoted on the bolts 20 mounted at either end in the side flanges 5 and 6 of the rim portion, and in the form of my invention shown in the drawings, there are as many pairs of these levers as there are segmental sections in the tire portion. The levers 19 are preferably formed as shown in Fig. 5, one of them having a comparatively long cylindrical bearing fitted upon the bolt 20, and the other having a central yoke with a bearing at either end of the cylindrical bearing of the first lever. The levers 19 at one end are pivotally connected at 18, to thrust links 16, there being two such links to each lever, and these links will be preferably connected at their lower ends by a bar 160, provided upon its under surface with a curved seat or groove 161, which engages and rests upon the rods or bolts 17, secured at their ends in the side flanges 10 and 11 of the segmental sections, and thus each segmental section has an operative engagement with the thrust links and through the thrust links with the crossed levers 19, as will be described. The opposite ends of the levers 19 are hooked as at 22, or otherwise formed, to be connected to the ends of coiled springs 21, each spring being interposed between adjacent pairs of crossed levers, and connected at one end to one of the levers of one pair and at its opposite end to one of the levers of the next adjacent pair of levers. Thus it will be apparent that while any given pair of levers are by their thrust links in operative engagement with a single segmental section of the tire portion, the levers operating such thrust links are controlled, and their movement under compressive load strains resisted, by a spring which acts upon one lever of adjacent pairs of levers, producing the transmission of the compressive force from any given segmental section which may be at the moment in contact with the ground, to the next adjacent segmental sections upon either side, and thus the adjacent segmental sections help to carry the load and in like manner bring into operation other and adjacent groups of elements of the compression resistance mechanism. It will be noted that the thrust links are forced outwardly or radially by means of the springs acting through the levers and that under the normal running conditions where the compressive movement of the segmental sections is slight under the load strains, the leverage secured by the pulling action of the springs is comparatively slight, and thus a sensitive cushioning effect is secured; but under an increased load strain the leverage is greatly increased by the rocking of the levers, the springs exerting in progressive ratio to the increase in load strains a greater pull, to overcome and resist the compressive movement of the segmental sections.

In the case of the ordinary pneumatic tire the resilient or cushioning effect is produced in a better manner than anything heretofore suggested, which is due to the fact that the resistance to compression is proportional to the surface which is depressed or flattened under the load strains this surface increasing rapidly near the tangent line. In the present invention the effect is much the same, the compressive radial movement of the segmental sections acting through the thrust links 10, to rock the levers to which the springs are connected, thus the springs are extended and the resistance to the compressive movement of the segmental sections of the tire increased owing to the change of position of the levers, such increased resistance being slight at first but increasing rapidly as the compressive movement of the segmental sections increases. While the rocking of the levers extending the springs, produces an increase in the leverage owing to the change in position of the arm of the lever to which the spring is connected proportionately to the sine of the angle of the levers with the central line of the helix of the springs, the leverage at the opposite ends of the levers to which the thrust links are connected is decreased in a similar way, thus in an increased ratio resisting the compressive movements of the segments under the load strains. This as before stated renders the cushion mechanism of my tire extremely sensitive to slight compressive movement of the segmental sections, and under normal running conditions produces a resilient effect similar to a pneumatic tire, and the springs are never subjected to an expansion and contraction sufficient to weaken them; thus a comparatively light and short spring may be employed. In the event of a sudden jolt or jar which greatly increases the compressive movement of the segmental sections under the load strains the resistance is greatly increased because of the sudden increase in the leverage effected under such conditions. Further it is to be noted that a sudden and abnormal application of compressive load strains to the tire will be progressively transferred to a greater number of segmental sections adjacent to the segmental section which at any given time may be in contact with the ground; thus the resistance to compression is doubly assisted, first by reason of the increased leverage produced by the increased compressive movement of any given segmental section, and second by the bringing into action of other and adjoining segmental sections and their compression resisting connections.

In order to prevent and to limit any extreme compressive movement of the tire portion with relation to the rim portion the side flanges 5 and 6, of the rim portion may be provided at intervals with the radially extending projections 23, which are connected by means of bolts or rods 24, which projections in the event of an extreme compressive action will as shown in Fig. 2, come to a stop bearing against the inner surface of the tread plates of the segmental section. In order that such extreme compressive movement of the tire portion shall not interfere with the proper pulling operation of the springs, the cylindrical sleeves 25, which surround the hinge pintles 121, are cut away on their upper or inner surfaces as shown at 26, (see Figs. 2, 3, and 4,) thus providing a recess in which the springs may find clearance.

As shown at Fig. 6, the tread plates of the segmental sections may be depressed below the projecting side portions 28, thus forming a groove or channel, in which may be placed a continuous tread surface formed of leather or any suitable sound deadening and frictional material, or as shown in Fig. 7, the tread plates may be formed with a series of longitudinal extending ribs 30, which themselves form the tread surface.

Having described my invention I claim as new and desire to protect by Letters Patent of the United States:

1. A wheel comprising a rim portion and a tire portion, the tire portion comprising a plurality of segmental sections jointed to each other and radially movable with relation to the rim portion, and a compression resistance mechanism interposed between the rim and tire portions, comprising levers pivoted to the rim portion each having one end operatively connected to one of the segmental sections, and springs interposed between and connected at their opposite ends to the levers of adjacent segmental sections, substantially as described.

2. A wheel comprising a rim portion and a tire portion, the tire portion comprising a plurality of segmental sections hinged together at their meeting ends, pairs of crossed levers pivoted to the rim portion, thrust links pivotally connected to one end of each of the crossed levers and having a rocking engagement with the segmental sections, each pair of levers being independently connected by means of their thrust links to a segmental section of the tire portion, and springs interposed between adjacent pairs of crossed levers and connected at either end to the free end of one of the adjacent pairs of levers, substantially as described.

3. A wheel comprising a rim portion and a tire portion, the tire portion comprising a plurality of segmental sections hinged together at their meeting ends and radially movable with relation to the rim portion, a plurality of pairs of crossed levers pivotally mounted upon the rim portion and one end of each lever being operatively connected to one of the segmental sections of the rim portion, and springs connected at either end to the opposite end of one of the levers of adjacent pairs of levers, substantially as described.

4. A wheel comprising a rim portion having continuous circular side flanges and a base plate, the whole united to form a substantially trough shaped rim, a tire portion comprising a plurality of segmental sections having side flanges and tread plates, the side flanges of the segmental sections having a sliding engagement with the side flanges of the rim portion, pairs of levers pivotally mounted in the rim portion, thrust links pivotally connected to the levers and having a rocking engagement with the segmental tire sections and springs connecting the ends of adjacent levers, substantially as described.

5. A wheel comprising a rim portion and a tire portion, the tire portion comprising a plurality of segmental sections having overlapping side flanges pivoted together to form a continuous articulated tire portion, sleeves mounted upon the pivots of the segmental sections, wings on the sleeves adapted to engage the inner faces of the tread plates of the segmental sections, and a yielding compression resistance mechanism interposed between the rim and tire portions, substantially as described.

6. A wheel comprising a rim portion and a tire portion, the tire portion comprising a plurality of segmental sections hinged together at their meeting ends and radially movable with relation to the rim portion, a plurality of pairs of levers pivotally mounted upon the rim portion and each having one of their ends operatively connected to one of the segmental sections of the tire portion, and springs interposed between the pairs of levers and connected at either end to the end of one of the levers of adjacent pairs of levers, substantially as described.

7. A wheel comprising a rim portion and a tire portion, the tire portion comprising a plurality of segmental sections hinged together at their meeting ends and radially movable with relation to the rim portion, a plurality of pairs of levers pivotally mounted upon the rim portion, thrust links pivotally connected to one arm of the levers and having a rocking engagement with the segmental sections, and springs interposed between the pairs of levers and connected at either end to the end of one of the levers of adjacent pairs of levers, substantially as described.

In testimony whereof I affix my signature in presence of two witnesses.

AXEL E. ELLIS.

Witnesses:
T. HART ANDERSON,
MARY A. KENNEY.